(12) United States Patent
Jafarkhani et al.

(10) Patent No.: US 7,796,821 B2
(45) Date of Patent: *Sep. 14, 2010

(54) METHOD AND SYSTEM FOR FUZZY CLUSTERING OF IMAGES

(75) Inventors: Hamid Jafarkhani, Irvine, CA (US); Vahid Tarokh, Belmont, MA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/268,960

(22) Filed: Nov. 11, 2008

(65) Prior Publication Data

US 2009/0074305 A1  Mar. 19, 2009

Related U.S. Application Data

(63) Continuation of application No. 11/838,668, filed on Aug. 14, 2007, now Pat. No. 7,460,717, which is a continuation of application No. 10/930,253, filed on Aug. 31, 2004, now Pat. No. 7,260,263, which is a continuation of application No. 09/819,557, filed on Mar. 28, 2001, now Pat. No. 6,798,911.

(51) Int. Cl.
 *G06K 9/62* (2006.01)
 *G06F 15/18* (2006.01)

(52) U.S. Cl. .................. 382/224; 382/155; 706/1

(58) Field of Classification Search ......... 382/115–128, 382/181, 224, 225, 155–161, 226–228, 232–253; 706/1–9, 52, 900; 704/245
See application file for complete search history.

(56) References Cited

U.S. PATENT DOCUMENTS 5,263,120 A    11/1993   Bickel
5,544,256 A    8/1996    Brecher et al.
5,572,597 A    11/1996   Chang et al.
5,778,156 A    7/1998    Schweid et al.
5,812,691 A    9/1998    Udupa et al.
5,828,776 A    10/1998   Lee et al.
5,842,194 A    11/1998   Arbuckle
5,852,823 A *  12/1998   De Bonet .................... 707/6
6,055,025 A    4/2000    Shahraray
6,064,770 A    5/2000    Scarth et al.
6,121,969 A    9/2000    Jain et al.
6,285,995 B1 * 9/2001    Abdel-Mottaleb et al. ..... 707/3
6,415,282 B1 * 7/2002    Mukherjea et al. ............ 707/3
6,751,363 B1 * 6/2004    Natsev et al. ............... 382/305
6,754,675 B2 * 6/2004    Abdel-Mottaleb et al. .................... 707/104.1
6,798,911 B1   9/2004    Jafarkhani et al.
6,950,533 B2 * 9/2005    Zlotnick ..................... 382/100
7,260,263 B1   8/2007    Jafarkhani et al.
7,460,717 B2   12/2008   Jafarkhani et al.
2004/0151384 A1 * 8/2004  Yang et al. .................. 382/225

* cited by examiner

*Primary Examiner*—Aaron W Carter

(57) ABSTRACT

An approach to clustering a set of images based on similarity measures employs a fuzzy clustering paradigm in which each image is represented by a node in a graph. The graph is ultimately partitioned into subgraphs, each of which represent true clusters among which the various images are distributed. The partitioning is performed in a series of stages by identifying one true cluster at each stage, and removing the nodes belonging to each identified true cluster from further consideration so that the remaining, unclustered nodes may then be grouped. At the beginning of each such stage, the nodes that remain to be clustered are treated as all belonging to a single candidate cluster. Nodes are removed from this single candidate cluster in accordance with similarity and connectivity criteria, to arrive at a true cluster. The member nodes of this true cluster are then removed from further consideration, prior to the next stage in the process.

20 Claims, 3 Drawing Sheets

100

200

$$\begin{bmatrix} 1 & 0.9 & 0.8 & 0 & 0 & 0 \\ 0.9 & 1 & 0.7 & 0.6 & 0 & 0 \\ 0.8 & 0.7 & 1 & 0.5 & 0 & 0 \\ 0 & 0.6 & 0.5 & 1 & 0.3 & 0 \\ 0 & 0 & 0 & 0.3 & 1 & 0.9 \\ 0 & 0 & 0 & 0 & 0.9 & 1 \end{bmatrix}$$

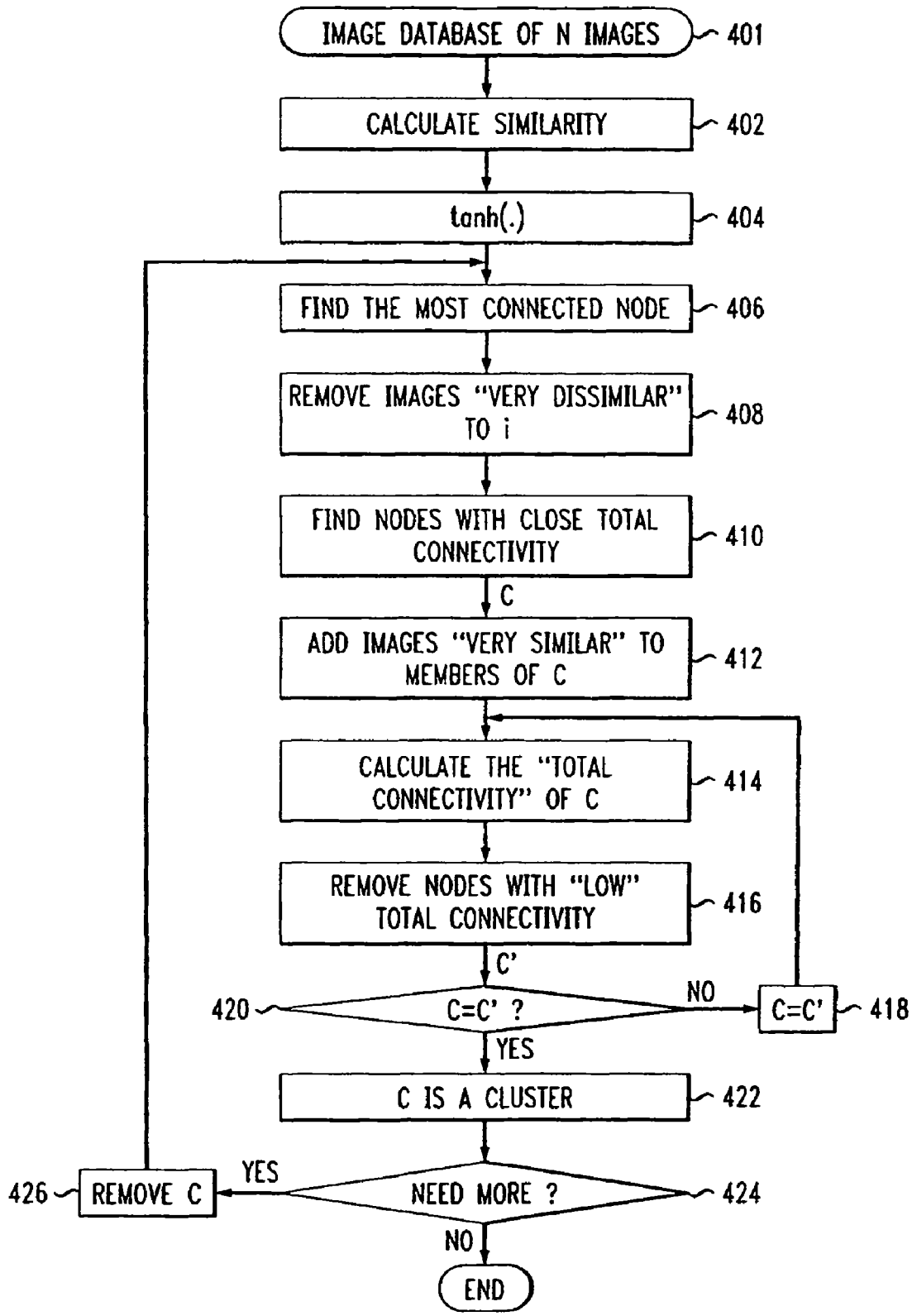

METHOD AND SYSTEM FOR FUZZY CLUSTERING OF IMAGES

CROSS-REFERENCE TO RELATED APPLICATIONS

This application is a continuation of U.S. patent application Ser. No. 11/838,668, filed Aug. 14, 2007, now U.S. Pat. No. 7,460,717, which is a continuation of U.S. patent application Ser. No. 10/930,253, filed Aug. 31, 2004, now U.S. Pat. No. 7,260,263, issued Aug. 21, 2007, which is a continuation of U.S. patent. application Ser. No. 09/819,557, filed Mar. 28, 2001, now U.S. Pat No. 6,798,911, issued Sep. 28, 2004. The aforementioned related patent applications are all herein incorporated by reference.

BACKGROUND OF THE INVENTION

Field of the Invention

This application is directed to a system and method for automatically clustering images into similar groups using fuzzy theory.

Clustering is a well known technique for partitioning a set of N objects into P groups, N>P, based on some set of metrics. Typically, the set of metrics includes one or more similarity measures in the form of either quantitative or qualitative factors which pertain to the similarity between these objects. Examples of known clustering methods are disclosed in B. Merkin, Mathematical Classification and Clustering, Kluwer Academic Publishers, 1996, and references cited therein.

The automatic clustering of images based on the content within the images has applications in indexing and retrieval of visual information. However, visual similarity is not very well defined since it is a subjective phenomenon. Distinguishing the similarity of two images using computers is difficult. Indeed, even humans may not agree on the similarity of two images. Furthermore, the definition of similarity depends on the goal of the clustering process. For example, two portraits of different people may be considered as similar if the goal of the clustering algorithm is to separate human faces from other images. On the other hand, the same two images are not similar if the goal is to find all pictures of one particular person from among a collection of portraits of different people. And while any similarity measure applicable to two images may be used, the particular similarity measure selected can affect the outcome of the clustering process. Consequently, similarity measures are selected based on their ability to provide effective discriminatory metrics for the variety of images to be clustered.

Prior art methods for clustering images are based on defining a similarity measure between two images. If $X_i$ and $X_j$ are two images in an image database containing a total of N images, a similarity measure $S_{i,j}$ between each pair of images $(X_i, X_j)$ can be established such that:

$S_{i,j}=1$ if $X_i$ and $X_j$ are similar, and         Eq. 1

$S_{i,j}=0$ if $X_i$ and $X_j$ are dissimilar.

Then, one can create a graph of N nodes in which each node corresponds to one of the N images and nodes i and j are connected if and only if $S_{i,j}=1$. Such a graph can be topologically complex and may have many dimensions. Accordingly, one can define such a graph as a binary symmetric N×N graph matrix A in which an element $a_{i,j}=1$ if nodes i and j are connected, element $a_{i,j}=0$ if nodes i and j are not connected, and element $a_{i,j}=1$. Equivalently, the graph can be defined by a list of the image pairs which are connected.

Given such a graph, one can then find the connected subgraphs using known algorithms in graph theory. Such connected subgraphs represent clusters of images within the database. However, the validity of the resulting clusters using the above paradigm depends heavily on the precision and correctness of the similarity measure $S_{i,j}$. Typically, the first step toward such a similarity measure is the calculation of a distortion measure $D_{i,j}$ between each of the (N)(N−1)/2 pairs of images. The distortion measure may be made using one or more features extracted from each of the original images. Then, using some threshold T, which perhaps is adaptively determined, one may decide if two images are similar, and assign an $S_{i,j}$ value of 1 to those deemed to be similar. Such a threshholding process results in an N×N binary matrix B created as follows:

$b_{i,j}=1$ if $a_{i,j}>T$, and         Eq. 2

$b_{i,j}=0$ otherwise.

However, one disadvantage of this process is that such threshholding results in the loss of information which may otherwise be used in some manner during the clustering process.

SUMMARY OF THE INVENTION

The present invention is directed to an approach for automatically clustering images in which the similarity measure is a fuzzy measure, i.e., $0 \leq S_{i,j} \leq 1$ based on the original distortion measure $D_{i,j}$. A fuzzy graph is effectively established, and a fuzzy clustering algorithm is then applied to the fuzzy graphs to find the corresponding connected subgraphs which, in turn, represent the clusters.

The method of the present invention begins with the calculation of a fuzzy similarity measure between an initial set of images to be clustered. Total connectivity values are then calculated for each of these images, the total connectivity for an image being the sum of a function of the various similarity measures associated with than image. The image having the highest connectivity, $I_{max}$, is determined to definitely belong to a current cluster that is being established, the current cluster initially including all the images which remain to be assigned to a true, final cluster. Images are removed from the current cluster based on either their similarity measures with respect to $I_{max}$, or their connectivity values, or both. Next, images which have just been removed from the current cluster, but have high similarity measures with respect to any of the images remaining in the current cluster are added back into the current cluster. Total connectivity values are then calculated for each of the images remaining in the current cluster, and those with low total connectivity values are removed. This last step is repeated until there is no change in the membership of the cluster. At this point, the current cluster is fixed and thus determined to be a "true" cluster, the images within the current cluster are removed from the initial set, and the remaining images subjected once again to the above process until all images have been assigned to true clusters.

In one aspect of the invention, the similarity measures are first transformed using a non-linear function prior to calculation of the total connectivity measures. The non-linear function may be a transcendental function such as a hyperbolic tangent.

In another aspect of the invention, the function f is the identity function so that the similarity measures are simply summed. However, the function f may instead be a non-linear function of the similarity measures.

BRIEF DESCRIPTION OF THE DRAWINGS

The present invention can better be understood through the attached figures in which:

FIG. 4 presents a flowchart of the steps entailed in a preferred embodiment of the present invention.

DETAILED DESCRIPTION

Figures 1, 2:
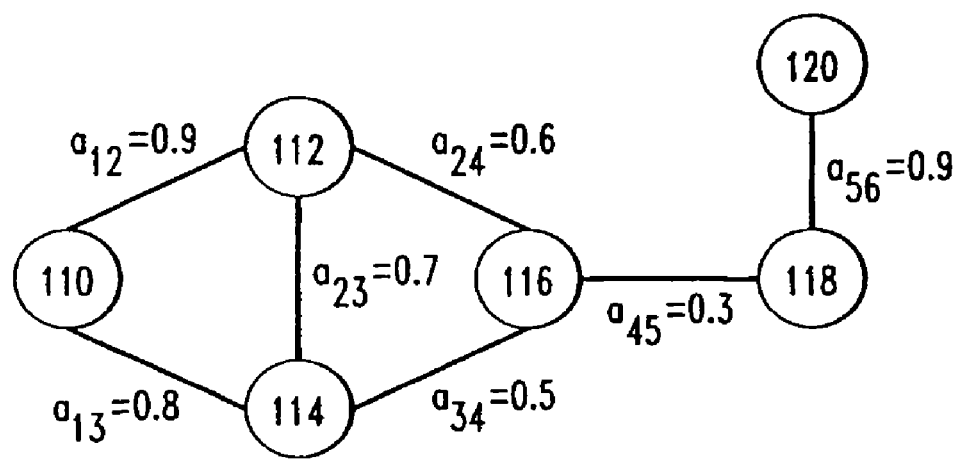
FIG. 1 shows an example of a fuzzy graph created in accordance with the image clustering method of the present invention.
FIG. 2 shows the corresponding fuzzy matrix for the fuzzy graph of FIG. 1.

In the context of the present invention, a fuzzy graph is defined much in the same way as a conventional graph, except that the elements in the graph matrix A are real numbers, preferably scaled to between zero and one ($0 \leq a_{i,j} \leq 1$) to facilitate further processing and comparisons. In addition, the similarity measure is commutative in that $a_{i,j}=a_{j,i}$ and the diagonal values $a_{j,i}=1$, as before. This implies that the "connectedness" between any two nodes i, j, i≠j, in the graph is a fuzzy relation. FIG. 1 shows an example of a fuzzy graph 100 comprising N=6 six nodes, which have been labeled 110, 112, 114, 116, 118 and 120. Non-zero similarity values $a_{12}$, $a_{13}$, $a_{23}$, $a_{24}$, $a_{34}$, $a_{45}$ and $a_{56}$ are established between certain pairs of these nodes. It is understood, however, that each node could theoretically be connected to every other node, making for a much more topologically complex graph.

FIG. 2 shows the corresponding fuzzy graph matrix 200 for the fuzzy graph 100 of FIG. 1. Entries in the matrix 200 represent the links $a_{i,j}$ in the fuzzy graph. In addition, as seen in FIG. 2, the matrix shows bilateral symmetry with $a_{i,j}=a_{j,i}$. It is understood, however, that the information in fuzzy graph matrix 200 could just as effectively be represented as a list of the node pairs along with their corresponding non-zero similarity values, since the pair-wise similarity values are the basis for the clustering process.

Figure 3A:
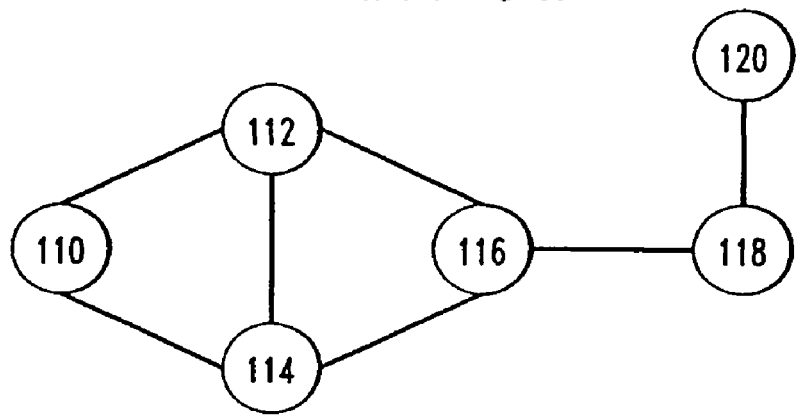
FIGS. 3a, 3b and 3c show candidate fuzzy subgraphs for the graph of FIG. 1, based on different threshold values.
Figure 3B:
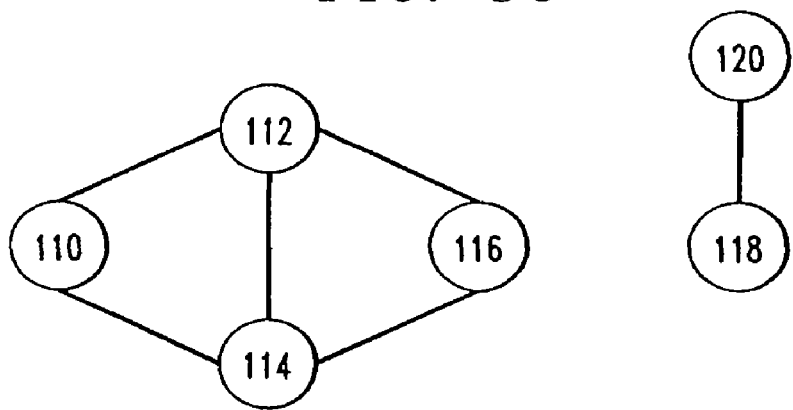
Figure 3C:
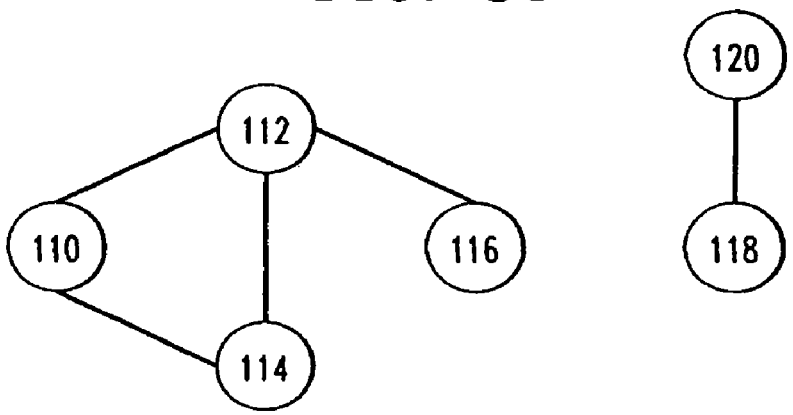

FIGS. 3a, 3b and 3c show subgraphs created by applying similarity thresholds of R=0.25, R=0.45 and R=0.55, respectively, to the fuzzy graph 100 of FIG. 1. As seen in FIG. 3a, a low similarity threshold of R=0.25 results in no clustering and leaves the original graph intact, without severing any of the links among the nodes. In effect, then, such a low threshold value performs no clustering and so does nothing to help differentiate among the images to which the nodes correspond. As seen in FIG. 3b, a moderate similarity threshold of R=0.45 partitions the original graph into two subgraphs by severing the link between nodes 116 and 118, effectively setting link $a_{45}$ (and thus also $a_{54}$) to zero. Thus, an R-value of 0.45 results in the original set of nodes being grouped into two distinct clusters. Finally, as seen in FIG. 3c, the higher similarity threshold of R=0.55 results in two subgraphs/clusters having the same node membership as in the case of R=0.45, but with link $a_{34}$ severed. Thus, setting R=0.55 leads to the same two clusters of images that resulted when R=0.45, with the caveat that one pair of images (those represented by nodes 114 and 116 in FIG. 1) is considered to be "dissimilar", even though each member of this pair is considered "similar" to some other image within the cluster to which the corresponding nodes have been assigned. Whether the two resulting clusters from either R=0.45 or R 0.55 should be the final partition of nodes is determined through further processing.

FIG. 4 presents a flowchart 400 for a process to cluster a set of N images, $\{X_1, X_2, \ldots, X_N\}$ in accordance with the present invention.

In step 402, (N)(N−1)/2 pair-wise initial similarity measures ($SN_{i,j}$) are calculated for the N images in a database. The similarity measures may be considered to belong to an N×N similarity matrix. Preferably, the resulting initial similarity measures are real-valued and range from zero to one. As discussed above, the particular similarity measure selected can affect the outcome of the clustering process. In a preferred embodiment of the present invention in which images from a video stream are clustered, the similarity measure that is used is the one disclosed in U.S. Pat. No. 6,055,025, entitled "Method and Apparatus for Detecting Abrupt and Gradual Scene Changes in Image Sequences", whose contents are incorporated by reference to the extent necessary to understand the present invention. It should be kept in mind, however, that the present invention contemplates that a variety of similarity measures may be employed, depending on the nature of the objects to be clustered.

In step 404, the individual initial similarity measures for the N nodes preferably are subjected to a nonlinear function. The purpose of the nonlinear function is to improve distance separation between the initial similarity measures $\{SN_{i,j}\}$ and arrive at similarity measures $\{S_{i,j}\}$ to be used in the remainder of the algorithm. More preferably, the nonlinear function is a transcendental function, and most preferably is a hyperbolic tangent of five times an initial similarity measure: $S_{i,j}$=tanh ($5 \times SN_{i,j}$). The transformed similarity measures are used in the remainder of the preferred embodiment discussed hereafter.

The present invention employs the concept of a "T-connectivity" $t_{i,c}$ of a node i belonging to a subgraph C. For the purposes of the preferred embodiment, $t_{i,c}$ is defined as the sum of a function f( ) of the similarity measures associated with that node. Mathematically, this can be represented as:

$$T_{i,C} = \sum_{j=1, j \neq i}^{N} f(S_{i,j}) \qquad \text{Eq. 3}$$

Function f( ) can simply be the identity function so that $t_{i,c}$ is simply the sum of the $S_{i,j}$. Alternatively, function f( ) can be a non-linear function which, for example, takes the square of the individual $S_{i,j}$ before they are summed. Other functions are also possible. Regardless of which such function is used, for the present purposes, we refer to a subgraph C as being "T-connected", if $t_{i,c}$>T, T being some connectivity threshold value, for all nodes i in subgraph C. Thus, a T-connected subgraph is one whose nodes all have a connectivity greater than T. Thus, the "T-connectedness" of a subgraph serves as a rough measure of the aggregate similarity of the nodes within that subgraph.

Initially, all N nodes are to be clustered and belong to a single graph and thus a single candidate cluster C. In a trivial sense, this single graph is a subgraph unto itself and has a T-connectedness corresponding to the lowest connectivity among all N nodes. And though all N nodes are initially considered to belong to a single candidate cluster C, the N nodes will ultimately be partitioned into some number P of smaller clusters, P<N.

Thus, in step 406, all nodes which remain to be clustered are considered to belong to a candidate cluster C, the connectivities of all of these nodes are calculated, and the node $I_{max}$ having the maximum connectivity $t_{max,c}$ is identified. Node $I_{max}$ is assumed to be a critical member of candidate cluster C, meaning that $I_{max}$ will always be a member of candidate cluster C and also the true cluster which is formed as a result of the process described below.

In step 408, nodes which are dissimilar to node $I_{max}$, the dissimilarity being based on their similarity measures with node $I_{max}$, are removed from candidate cluster C. One approach to this is to remove nodes j which have similarity measures with node $I_{max}$ lower than some threshold T1. Thus, nodes j for which $S_{Imax,j}$<T1 applies, are removed from candidate cluster C. Threshold T1 can be adaptively set, such as by taking a predetermined proportion p1, such as p1=75%, of the maximum similarity measure $S_{max}$=Max $\{S_{i,j}\}$. Another approach may be to remove a total of N1 nodes having the N1 lowest similarity measures with node $I_{max}$. In such case, N1 can be a predetermined proportion p2, such as p2=50%, of the total number of nodes remaining to be clustered. Other approaches to eliminating dissimilar nodes based on the similarity measures are also possible.

In step 410, nodes j which have a total connectivity $t_{j,c}$ which differs from $t_{max,C}$ by more than some threshold value T2, are also removed from candidate cluster C. Thus, node j is removed if $t_{max,C}-t_{j,C}$>T2. The threshold T2 can be adaptively determined, such as by taking a predetermined proportion p3, such as p3=25%, of $t_{max,C}$.

It should be noted here that the order in which steps 408 and 410 are carried out can make a difference in the set of nodes that remain in candidate cluster C. The present invention also encompasses the situation is which these two steps are reversed.

In step 412, nodes j which have been removed from candidate cluster C due to the actions takes in steps 408 and 410 may be added back to candidate cluster C. The criterion for adding these nodes back to candidate cluster C is that their similarity measures with at least one node i which remains in candidate cluster C after steps 408 and 410 be greater than some threshold T3. Thus, a node j which had been removed may be added back to candidate cluster C if $S_{i,j}$>T3, for some i still belonging to C (i 0 C). Threshold T3 can be adaptively set, such as by taking a predetermined proportion p4, such as p4=75%, of the maximum similarity measure $S_{max}$=Max $\{S_{i,j}\}$.

In step 414, the connectivities $t_{i,c}$ for each of the nodes remaining in candidate cluster C, as it then appears, are calculated. Next, in step 416, those nodes which have connectivities lower than some threshold T4 are removed from candidate cluster C to arrive at modified candidate cluster CN. Threshold T4 preferably is formed by taking a predetermined proportion p5, such as p5=50%, of the maximum connectivity among the nodes in candidate cluster C. Steps 414 and 416 are repeated with CNN replacing C, as seen in step 418, until there are no more changes and C=CN, as determined in comparison step 420. If, however, the membership in C and CN oscillates, then threshold T4 may be adaptively adjusted, preferably by gradually lowering it with each pass until convergence is achieved.

If it is determined in step 420 that the node membership in candidate cluster C has been finalized, control flows to step 422 in which candidate cluster C is established as a true cluster formed by a subset of the N original nodes.

Next, in step 424, a determination is made as to whether the entire set of N nodes has been clustered. If so, the process is finished. If not, however, then at step 426, the nodes of the most recently formed true cluster are deleted from the set of nodes remaining to be clustered, and the process continues with step 406 using the nodes which remain to be clustered. In this manner, a single true cluster is established during each stage of the overall process, a stage comprising a single pass of the algorithm represented by steps 406 through 424.

In the foregoing analysis, steps 404 through 426 were discussed without specific reference to the fact that, in the preferred embodiment, the initial similarity measures were for a set of images. Accordingly, it should be recognized that the foregoing algorithm of the preferred embodiment may have applicability in clustering similarity measures, regardless of the underlying items to be clustered. Furthermore, it should be evident to one skilled in the art that the above-described embodiment is readily implemented in computer software, using some high-level programming language to run on a general purpose computer.

And finally, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

The invention claimed is:

1. A method for clustering a set of N images into P final clusters, where N and P are integers, comprising:
   calculating at least one similarity measure $S_{i,j}$ between members of each pair of images, where the similarity measure $S_{i,j}$ represents the similarity measure between an ith image and an jth image with i and j being image indices;
   calculating a total connectivity value for each of the images remaining to be clustered, where the total connectivity value for each image being defined as a sum of a function f of the similarity measures associated with that image;
   identifying, from among the images remaining to be clustered, a maximum total connectivity value $T_{max}$ corresponding to an image $I_{max}$, where the image $I_{max}$ belonging to a current cluster which initially includes all images remaining to be clustered;
   removing, from the current cluster, at least one image based on at least one of its similarity measure with image $I_{max}$ and its total connectivity value within the current cluster;
   adding, to the current cluster, images having similarity measures that are greater than a first threshold;

calculating, for each image within the current cluster, the total connectivity value based on those images within the current cluster;

removing, from the current cluster, those images having the total connectivity value less than a second threshold; and repeating the calculating of the total connectivity value based on those images within the current cluster and the removing from the current cluster those images having the total connectivity value less than the second threshold until no further images are removed to thereby establish the current cluster as one of the final clusters.

2. The method of claim 1, further comprising:

removing all images in the current cluster from further consideration; and repeating the calculating of the total connectivity value for each of the images remaining to be clustered, the identifying, from among the images remaining to be clustered, the maximum total connectivity value $T_{max}$ corresponding to the image $I_{max}$, the removing the at least one image based on the at least one of its similarity measure with image $L_{max}$ and its total connectivity value within the current cluster, the adding of images having the similarity measures that are greater than the first threshold, the calculating of the total connectivity value based on those images within the current cluster, the removing from the current cluster those images having the total connectivity value less than the second threshold, the repeating of the calculating of the total connectivity value based on those images within the current cluster and the removing from the current cluster those images having the total connectivity value less than the second threshold, and the removing of all images in the current cluster from further consideration, until all N images are assigned to a final cluster.

3. The method of claim 2, further comprising:

applying a non-linear function to each similarity measure $S_{i,j}$, prior to calculating the total connectivity value.

4. The method of claim 3, wherein the non-linear function is a transcendental function.

5. The method of claim 4, wherein the transcendental function is a hyperbolic tangent.

6. The method of claim 5, wherein each similarity measure $S_{i,j}$ is transformed according to a formula $\tanh(5 \times S_{i,j})$, prior to calculating the total connectivity value.

7. The method of claim 2, wherein the function f is an identity function.

8. The method of claim 2, wherein the function f is a nonlinear function.

9. The method of claim 2, wherein in the removing, at least one image is removed from the current cluster based on its similarity measure $S_{i,j}$ with image $I_{max}$, and then at least one other image is removed from the current cluster based on its total connectivity value within the current cluster.

10. The method of claim 2, wherein in the removing, at least one image is removed from the current cluster based on its total connectivity value within the current cluster, and then at least one other image is removed from the current cluster based on its similarity measure $S_{i,j}$ with image $I_{max}$.

11. The method of claim 2, wherein in the removing images having the similarity measure $S_{i,j}$ with $I_{max}$ that is less than a third threshold are removed from the current cluster.

12. The method of claim 2, wherein in the removing, a number N1 images having the N1 lowest similarity measures $S_{i,j}$ with $I_{max}$ are removed from the current cluster.

13. The method of claim 2, wherein in the removing images having the total connectivity value which differs from $t_{max}$ by more than a fourth threshold are removed from the current cluster.

14. The method of claim 13, wherein images having the similarity measure $S_{i,j}$ with $I_{max}$ that is less than a third threshold are removed from the current cluster.

15. The method of claim 14, wherein at least one image is removed from the current cluster based on its similarity measure $S_{i,j}$ with image $I_{max}$, and then at least one other image is removed from the current cluster based on its total connectivity value within the current cluster.

16. The method of claim 13, wherein a number N1 images having the N1 lowest similarity measures $S_{i,j}$ with $I_{max}$ are removed from the current cluster.

17. The method of claim 16, wherein at least one image is removed from the current cluster based on its similarity measure $S_{i,j}$ with image $I_{max}$, and then at least one other image is removed from the current cluster based on its total connectivity value within the current cluster.

18. An apparatus for clustering a set of N images into P final clusters, where N and P are integers, comprising:

means for calculating at least one similarity measure $S_{i,j}$ between members of each pair of images, where the similarity measure $S_{i,j}$ represents the similarity measure between an ith image and an jth image with i and j being image indices;

means for calculating a total connectivity value for each of the images remaining to be clustered, where the total connectivity value for each image being defined as a sum of a function f of the similarity measures associated with that image;

means for identifying, from among the images remaining to be clustered, a maximum total connectivity value $t_{max}$ corresponding to an image $I_{max}$, where the image $I_{max}$ belonging to a current cluster which initially includes all images remaining to be clustered;

means for removing, from the current cluster, at least one image based on at least one of its similarity measure with image $I_{max}$ and its total connectivity value within the current cluster;

means for adding, to the current cluster, images having similarity measures that are greater than a first threshold;

means for calculating, for each image within the current cluster, the total connectivity value based on those images within the current cluster; and means for removing, from the current cluster, those images having the total connectivity value less than a second threshold, wherein the total connectivity value calculating and the image removing are repeated until no further images are removed to thereby establish the current cluster as one of the final clusters.

19. The apparatus of claim 18, further comprising:

means for removing all images in the current cluster from further consideration, wherein one or more of the calculating, the identifying, the removing, and the adding are repeated until all N images are assigned to a final cluster.

20. A non-transitory computer-readable medium having stored thereon a plurality of instructions, the plurality of instructions including instructions which, when executed by a processor, cause the processor to perform steps of a method for clustering a set of N images into P final clusters, where N and P are integers comprising:

calculating at least one similarity measure $S_{i,j}$ between members of each pair of images, where the similarity measure $S_{i,j}$ represents the similarity measure between an ith image and an jth image with i and j being image indices;

calculating a total connectivity value for each of the images remaining to be clustered, where the total connectivity value for each image being defined as a sum of a function f of the similarity measures associated with that image;

identifying, from among the images remaining to be clustered, a maximum total connectivity value $T_{max}$ corresponding to an image $I_{max}$, where the image $I_{max}$ belonging to a current cluster which initially includes all images remaining to be clustered;

removing, from the current cluster, at least one image based on at least one of its similarity measure with image $I_{max}$ and its total connectivity value within current cluster;

adding, to the current cluster, images having similarity measures that are greater than a first threshold;

calculating, for each image within the current cluster, the total connectivity value based on those images within current cluster;

removing, from the current cluster, those images having the total connectivity value less than a second threshold; and repeating the calculating of the total connectivity value based on those images within the current cluster and the removing from the current cluster those images having the total connectivity value less than the second threshold until no further images are removed to thereby establish the current cluster as one of the final clusters.

* * * * *